(12) United States Patent
Lotzer et al.

(10) Patent No.: US 11,609,897 B2
(45) Date of Patent: Mar. 21, 2023

(54) METHODS AND SYSTEMS FOR IMPROVED SEARCH FOR DATA LOSS PREVENTION

(71) Applicant: Swisscom AG, Bern (CH)

(72) Inventors: Hans-Joachim Lotzer, Bern (CH); Klaus Gerhard Haller, Bern (CH)

(73) Assignee: SWISSCOM AG, Bern (CH)

( * ) Notice: Subject to any disclaimer, the term of this patent is extended or adjusted under 35 U.S.C. 154(b) by 919 days.

(21) Appl. No.: 15/723,883

(22) Filed: Oct. 3, 2017

(65) Prior Publication Data

US 2018/0096021 A1 Apr. 5, 2018

(30) Foreign Application Priority Data

Oct. 3, 2016 (CH) .................................. 01309/16

(51) Int. Cl.
*G06F 16/23* (2019.01)
*G06F 16/2455* (2019.01)
*G06F 21/62* (2013.01)

(52) U.S. Cl.
CPC .... *G06F 16/2365* (2019.01); *G06F 16/24553* (2019.01); *G06F 21/6227* (2013.01); *G06F 21/6245* (2013.01)

(58) Field of Classification Search
CPC .......... G06F 16/2365; G06F 16/24553; G06F 21/6227; G06F 21/6245
See application file for complete search history.

(56) References Cited

U.S. PATENT DOCUMENTS

2009/0300770 A1 12/2009 Rowney et al.
2012/0226677 A1 9/2012 Bolton et al.
2012/0226858 A1 9/2012 Steitz et al.
2013/0054650 A1 2/2013 O'Byrne
2013/0325820 A1* 12/2013 Grube ................... G06F 11/076
707/691

(Continued)

FOREIGN PATENT DOCUMENTS

EP 2942731 11/2015
WO 2014155380 10/2014

OTHER PUBLICATIONS

European Search Report for EP17193574, dated Nov. 13, 2017, 2 pages.

*Primary Examiner* — Etienne P Leroux
*Assistant Examiner* — Husam Turki Samara
(74) *Attorney, Agent, or Firm* — McAndrews, Held & Malloy, Ltd.

(57) ABSTRACT

Methods and systems are provided for enhanced data loss prevention. The enhanced data loss prevention may be applied to data that is structured and/or semi-structured data, with the data comprising a plurality of records and a plurality of categories, with each record comprising a plurality of fields, each of which being associated with a different one of the plurality of categories. The enhanced data loss prevention may comprise selecting a subset of records of the data, with the selected subset comprising at least two records having between then one or more records not included in the subset. The fields of the selected subset may be scanned for sensitive information, and a likelihood to contain the sensitive information may be computed for each category based on the scanning. A subset of categories may be selected based on the computed likelihoods, and the sensitive information in the selected subset may be searched.

32 Claims, 4 Drawing Sheets

(56) References Cited

U.S. PATENT DOCUMENTS

2014/0372462 A1* 12/2014 Leahy Wise .......... G06F 16/284
707/756
2016/0034305 A1* 2/2016 Shear .................... G06F 16/245
707/722
2016/0078023 A1* 3/2016 Schalk ................ G06F 16/2386
707/825

* cited by examiner

| | 31 | 32 | 33 | 34 | 35 | 36 | 37 |
|---|---|---|---|---|---|---|---|
| | Name | Number | Account Balance | CRM Information | Customer since | Flyer | Address |
| 20 | Jon Doe | 4348000000000000 | 1'003.97 | Electrical engineer | 1999 | yes | - |
| 21 | Jane Doe | 4348000000000000 | 2'800.65 | Famous writer | 2000 | yes | Paris |
| 22 | Jack London | 4348000000000000 | 3'000.50 | Owner of Chemicals Ltd» | 1985 | yes | London |
| 23 | Max Mustermann | 4349123412341230 | 100'000.00 | Close friend of Paris Hilton | 1920 | yes | Germany |
| 24 | Paris Hilton | 4349367856785670 | 522'400.00 | Likes Arts and literature | 1981 | yes | Los Angeles |
| 25 | ACME Ltd | 4349123412341230 | 10'500.00 | Company credit card | 2014 | yes | Frankfurt |
| 26 | ACME Ltd | 4349123412341230 | 2'559.30 | Company credit card | 2014 | yes | Frankfurt |
| 27 | ... | ... | ... | ... | ... | ... | ... |
| 28 | ... | ... | ... | ... | ... | ... | ... |
| | Name | Number | Account Balance | CRM Information | Customer since | Address | Flyer |
| 20' | John Smith | 4348003570000000 | 1'003.97 | - | 1998 | - | yes |
| 21' | Herr Müller | 4348000035100000 | 2'800.65 | - | 2010 | Berlin | yes |
| 22' | Unknown | 4348000000000020 | 3'000.50 | - | 1987 | Madrid | yes |
| 23' | ... | ... | ... | ... | ... | ... | ... |

Fig. 1

| Name | Number | Account Balance | CRM Information | Customer since | Flyer | Address |
|---|---|---|---|---|---|---|
| Jon Doe | 4348000000000000 | 1'002.97 | Electrical Engineer | 1998 | yes | Paris |
| Jane Doe | 4348000000000000 | 2'800.85 | Famous writer | 2010 | yes | London |
| Jack London | 4349123413341230 | 3'000.50 | Owner of «Chemicals Ltd» | 1985 | yes | Germany |
| Max Mustermann | 4349567858783670 | 100'000.00 | Close friend of Paris Hilton | 1920 | yes | Los Angeles |
| Paris Hilton | 4349123412341230 | 522'400.00 | Likes Arts and Literature | 1981 | yes | Frankfurt |
| ACME Ltd | 4349123412341230 | 10'500.00 | Company creditcard | 2014 | yes | Frankfurt |
| ACME Ltd | | 2'359.38 | Company creditcard | 2014 | | |
| ... | ... | ... | ... | ... | ... | ... |

| Name | Number | Account Balance | CRM Information | Customer since | Flyer | Address |
|---|---|---|---|---|---|---|
| John Smith | 4348005670000000 | 1'003.97 | - | 1998 | - | - |
| Hari Müller | 4348000035100000 | 2'866.85 | - | 2000 | Bodas | Madrid |
| Unknown | 4348000000000020 | 3'000.50 | - | 1987 | yes | - |
| ... | ... | ... | ... | ... | ... | ... |
| ... | ... | ... | ... | ... | ... | ... |

Fig. 2

| Name (31) | Number (32) | Account Balance (33) | CRM Information (34) | Customer since (35) | Flyer (36) | Address (37) |
|---|---|---|---|---|---|---|
| Jon Doe | 4348000000000000 | 1'063.97 | Electrical Engineer | 1999 | yes | |
| Jane Doe | 4348000000000020 | 2'800.65 | Famous writer | 2000 | yes | Paris |
| Jack London | 4348000000000200 | 3'000.50 | Owner of Chemicals Ltd» | 1985 | yes | London |
| Max Mustermann | 4349122412341230 | 100'000.00 | Chef: Frankfurt Patisserie | 1920 | yes | Germany |
| Paris Hilton | 4349567856785670 | 5'224'000.00 | Likes: Arts and Literature | 1981 | yes | Los Angeles |
| ACME Ltd | 4349123412341230 | 10'500.00 | Company creditcard | 2014 | yes | Frankfurt |
| ACME Ltd | 4349123412341230 | 2'559.30 | Company creditcard | 2014 | yes | Frankfurt |
| ... | ... | ... | ... | ... | ... | ... |

| Name (31) | Number (32) | Account Balance (33) | CRM Information (34) | Customer since (35) | Address (36) | Flyer (37) |
|---|---|---|---|---|---|---|
| John Smith | 4348005670000000 | 1'003.97 | - | 1998 | | yes |
| Herr Müller | 4348000015100000 | 2'400.65 | - | 2000 | Berlin | yes |
| Unknown | 4348000000000020 | 3'000.50 | - | 1987 | Madrid | yes |
| ... | ... | ... | ... | ... | ... | ... |

Fig. 3

| Name (31) | Number (32) | Account Balance (33) | CRM Information (34) | Customer since (35) | Flyer (36) | Address (37) |
|---|---|---|---|---|---|---|
| Joe Doe | 4348000000000000 | 1'003.97 | Electrical Engineer | 1999 | yes | Paris |
| Jane Doe | 4348000000020000 | 2'800.65 | Famous writer | 2000 | yes | London |
| Jack Landon | 4348000000000000 | 3'000.50 | Owner of chemicals Ltds | 1985 | yes | ... |
| Max Mustermann | 4349123412341230 | 100'000.00 | Close friend of Paris Hilton | 1920 | yes | Germany |
| Paris Hilton | 4349567856785670 | 527'400.00 | Likes Arts and literature | 1981 | yes | Los Angeles |
| ACME Ltd | 4349123412341230 | 10'500.00 | Company credit card | 2014 | yes | Frankfurt |
| ACME Ltd | 4349123412341230 | 2'559.30 | Company credit card | 2014 | ... | Frankfurt |

| Name (31) | Number (32) | Account Balance (33) | CRM Information (34) | Customer since (35) | Address (36) | Flyer (37) |
|---|---|---|---|---|---|---|
| John Smith | 4348005700000000 | 1'003.97 | ... | 1998 | Berlin | yes |
| Herr Müller | 4348000035100000 | 2'800.65 | ... | 2000 | Madrid | yes |
| Unknown | 4348000000000020 | 3'000.50 | ... | 1987 | ... | yes |

Fig. 4

METHODS AND SYSTEMS FOR IMPROVED SEARCH FOR DATA LOSS PREVENTION

CLAIM OF PRIORITY

This patent application claims the filing date benefit of and right of priority to Swiss Patent Application Serial No. 01309/16, filed Oct. 3, 2016. The above application is hereby incorporated herein by reference in its entirety.

TECHNICAL FIELD

The present disclosure relates to computer related solution. In particular, various implementations in accordance with the present disclosure relate to the field of data management, particularly for improved search for data loss prevention.

BACKGROUND

Conventional methods and systems for handling data loss and/or preventing thereof, if any existed, can be costly, cumbersome and inefficient. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for improved search for data loss prevention, substantially as shown in and/or described in connection with at least one of the figures, as set forth more completely in the claims.

These and other advantages, aspects and novel features of the present disclosure, as well as details of an illustrated implementation thereof, will be more fully understood from the following description and drawings.

BRIEF DESCRIPTION OF THE DRAWINGS

Various features and advantages of the disclosure will become apparent from the following description of non-limiting exemplary implementations, with reference to the appended drawings, in which:

FIG. 1 illustrates an example of structured and/or semi-structured data.

FIG. 2 illustrates an example use scenario for selection of a subset of records in structured and/or semi-structured data.

FIG. 3 illustrates an example scanning result for sensitive information in structured and/or semi-structured data.

FIG. 4 illustrates an example use scenario for selection of a subset of classes in structured and/or semi-structured data.

DETAILED DESCRIPTION OF THE DISCLOSURE

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Certain example implementations in accordance with the present disclosure may be found in systems and methods for improved search for data loss prevention, as described below in more detail with reference to the attached figures. In this regard, protection of data (e.g., data of business entity or any other organization) is becoming more and more important—e.g., because loss of data may have adverse consequences, such as disadvantages in the market, violations of legal requirements, etc. Thus, data loss prevention (DLP) tools may be used to manage large amounts of data and to detect the risk of data leaks. In this regard, DLP tools may scan data for potentially sensible data—e.g., using keyword searches or rule based searches.

The risk of data loss is present for data at rest (e.g., data maintained in SharePoint servers, databases, or other kinds of repositories), for data in motion (e.g., data transferred within the business entity and/or to outside recipients via the network, such by via emails, FTP transvers, or social media), and for data at endpoints, such as in personal computers, laptops, tablet, smartphones, etc. Depending on the DLP tool, it may consider data at rest, e.g. large databases, central repositories, etc. Scanning through data (especially data at rest, such as large databases, and large amounts of data in motion) may be very cumbersome, time-consuming, and/or resource-consuming. Therefore, most existing DLP tools scan only a part of the data. This results in large of amount of data not getting scanned and thus possible issues not being detected, which is clearly a drawback.

Some existing solutions attempt to address this drawback. For example, in on existing approach, a first block of structured data is analyzed to detect the type of information stored in the first block. When a certain information is searched in the structured data, only those parts of the other blocks are searched which are relevant for the certain information. However, this approach would not detect a large amount of sensible data, such as if the structured data contains two different structures or store different types of information in the same fields—e.g., when new releases of an application adapt the data models in the database.

Accordingly, in various implementations in accordance with the present disclose, enhanced data loss prevention mechanisms may be utilized to overcome drawback of existing solutions, such as by searching or scanning through data in a more reliable and still efficient way. In various example implementations, this may be done by selecting a statistically representative subset of records to scan fields of the record for sensitive information. This yields a reliable basis for detecting the categories in which potential sensitive information are contained. In addition, a likelihood is computed for how likely a sensitive information is contained in each category. On the basis of this likelihood, the search for the sensitive information may be reduced to a subset of categories in which the complete data are scanned for the sensitive information without reducing the reliability of the results.

In an example implementation, data loss prevention (DLP) may be configured for application to all kinds of structured or semi-structured data. Examples of structured data include databases, lists, etc. An example for semi-structured data is Extensible Markup Language (XML) data. The data includes a plurality of records and a plurality of categories. The number of records may be very high such that the amount of data is very large and necessitates a large effort to search through the whole content of the data, in particular if the searched information is abstract. The records may be stored in an ordered manner such that a subsequent record (e.g., a directly neighboring record in one direction) of each record is well defined. Each record comprises a plurality of fields belonging to different categories. A category of fields refers to a structural similarity or a common attribute of the fields in different records. The fields of the same category of fields for different records may have the same size. Nonetheless, in some implementations it is also possible that the fields of the same class of different records have different sizes. It is further possible that some records have fields of categories not common to all records.

An example method for data loss prevention in accordance with the present disclosure may comprise applying data loss prevention to data that may comprise a plurality of records and a plurality of categories, with each record comprising a plurality of fields and each of the plurality of fields corresponding to a different one of the plurality of categories, where the applying of data loss prevention comprises: selecting a subset of records from the plurality of records of the data, with the selected subset of records comprising at least two records having between them at least one record not included in the selected subset of records; scanning fields of the selected subset of records for sensitive information, with the fields of the selected subset of records comprising the plurality of fields of each record of the selected subset of records; computing based on a result of the scanning, for each category a likelihood to contain the sensitive information; selecting a subset of categories based on the computed likelihoods of the categories to contain the sensitive information; and searching the sensitive information in the selected subset of categories.

In an example implementation, the method may comprise determining a number of records of the selected subset of records based on a number of records and/or on a number of unique records in the data.

In an example implementation, the method may comprise determining a number of records of the selected subset of records based on a parameter of an infrastructure utilized in storing the data and/or applying the data loss prevention. The parameter may comprise a speed of a processor applying the data loss prevention or a bandwidth of a communication link between the processor and a storage element where the data is stored.

In an example implementation, the likelihood to contain the sensitive information may comprise more than two possible values of likelihood.

In an example implementation, the scanning of the fields of the selected subset of records for sensitive information may comprise detecting a plurality of keywords and/or at least one rule in the fields of the selected subset of records. Each of the plurality of keywords and/or rules is associated with a likelihood to contain the sensitive information; and the likelihood to contain the sensitive information in a category is computed based on the likelihood associated with the keywords and/or rules in the category.

In an example implementation, the sensitive information may comprise at least two types of sensitive information, and the method may comprise scanning each of the at least two types of sensitive information in the selected subset of records based on detecting a plurality of keywords and/or at one least one rule; with at least some of the keywords and/or the at least one rule being associated with different likelihoods to the at least two types of sensitive information; and the likelihood of a category to contain one of the at least two types of sensitive information in a field being based on the likelihood of the keywords and/or the at least one rule associated with this type of sensitive information which are found in this category. Each keyword and/or rule associated with more of the at least two types of sensitive information is searched only once for detecting potential occurrences of all types of sensitive information related to the searched keyword and/or rule.

An example system in accordance with the present disclosure for data loss prevention may comprise a storage circuit operable to store data, with the data comprising a plurality of records and a plurality of categories, and with each record comprising a plurality of fields and each of the plurality of fields corresponding to a different one of the plurality of categories; and a processor configured to apply data loss prevention to the data, where the processor is operable to: select a subset of records from the plurality of records of the data, with the selected subset of records comprising at least two records having between them at least one record not included in the selected subset of records; scan fields of the selected subset of records for sensitive information, with the fields of the selected subset of records comprising the plurality of fields of each record of the selected subset of records; compute based on result of the scanning, for each category a likelihood to contain the sensitive information; select a subset of categories based on the computed likelihoods of the categories to contain the sensitive information; and search the sensitive information in the selected subset of categories.

In an example implementation, the processor may be operable to determine a number of records of the selected subset of records based on a number of records and/or on a number of unique records in the data.

In an example implementation, the processor may be operable to determine a number of records of the selected subset of records based on a parameter of the system. The parameter may comprise a speed of the processor and/or a bandwidth of a communication link between the storage circuit and the processor.

In an example implementation, the likelihood to contain the sensitive information may comprise more than two possible values of likelihood.

In an example implementation, the scanning of the fields of the selected subset of records for sensitive information may comprise detecting a plurality of keywords and/or at least one rule in the fields of the selected subset of records. Each of the plurality of keywords and/or rules is associated with a likelihood to contain the sensitive information; and the likelihood to contain the sensitive information in a category is computed based on the likelihood associated with the keywords and/or rules in the category.

In an example implementation, the sensitive information may comprise at least two types of sensitive information, and the processor is operable to scan each of the at least two types of sensitive information in the selected subset of records based on detecting a plurality of keywords and/or at one least one rule; with at least some of the keywords and/or the at least one rule being associated with different likelihoods to the at least two types of sensitive information; and the likelihood of a category to contain one of the at least two types of sensitive information in a field being based on the likelihood of the keywords and/or the at least one rule associated with this type of sensitive information which are found in this category. Each keyword and/or rule associated with more of the at least two types of sensitive information is searched only once for detecting potential occurrences of all types of sensitive information related to the searched keyword and/or rule.

FIG. 1 illustrates an example of structured and/or semi-structured data. Shown in FIG. 1 is a structured or semi-structured data list 1.

In this regard, the data structures described hereinafter may be implemented, and/or the various steps described hereinafter with respect to utilizing such data structures may be performed in a system (not shown) that comprises suitable circuitry for implementing various aspects of the present disclosure. Such circuitry may comprise, e.g., general or dedicated processing circuitry, storage circuitry, communication-related circuitry, etc. In some instance, such system may be implemented as a single physical apparatus, which may reside centrally in a network utilizing the described scheme, and be operated by the network provider. In other instances, however, the various steps and/or related operations may be performed by various different components and/or subsystems of the network. In this regard, the different components and/or subsystems may interact with each other, and data or control services may be performed or handled either in a centralized way, or may have their functionalities distributed among the different subsystems, for example leveraging the cooperation between the elements of each subsystem.

As shown in FIG. 1, the data list 1 may comprise rows 21, 22, 23, . . . correspond to records, and columns 31, 32, 33, 34, 35, 35, 37, corresponding to categories of fields. Each of records or rows 21, 22, 23, . . . may comprise a field for each column 31, 32, 33, 34, 35, 35, 37, and/or vice versa. However, in an alternate implementation, the columns 31, 32, 33, 34, 35, 35, 37 may comprise records and the rows 21, 22, 23, . . . may correspond to categories of fields as well. Nonetheless, while the example data structure illustrated in FIG. 1 (and referred back to in other figures) is a data list, the disclosure should be not understood to be restricted to data lists; rather, all of the features and functions described hereinafter should be understood to apply equivalently to structured and/or semi-structured data, records, and categories of fields analogously.

In the example use scenario shown in FIG. 1, the data list 1 changes its structure over time in order to show better the benefits an data loss prevention (DLP) scheme in accordance with the present disclosure. However, the disclosure is also applicable to data with homogenous structures. While a first structure is used in a first portion of rows 21, 22, . . . , a second structure is used in a second portion of the rows 21', 22', 23', . . . . In the first portion, column 36 relates to "Flyer" and column 37 to "Address", while this is inverted in the second portion of rows 21', 22', 23', . . . . The data list 1 may be stored in a storage element of the system. For data at rest, this storage element may comprise a portion of hard disc, a storage center, or the like. For data in motion, the storage element may comprise be a short term storage (e.g., buffer) for buffering the data for analysis.

An enhanced scheme for data loss prevention (DLP) is described hereinafter, being applied to structured or semi-structured data, such as the data list 1 of FIG. 1. In this regard, the enhanced DLP scheme may be performed on the data, as stored in the storage element, by suitable circuitry (or circuit) or processor. The terms processor and/or circuit are used here equivalently and should both comprise the meaning of the respectively other one. The circuitry and/or processor may be a single processor or circuit, but could also comprise a plurality of processors and/or circuits being connected between each other to perform the described enhanced DLP scheme (or steps thereof). In this regard, multiple processors and/or circuits may be arranged close together in a common housing or building; but may also be remote from each other constituting a cloud of processors and/or circuits.

In a first step of the example enhanced DLP scheme, a subset of records of the data is selected. The subset may be selected such that it statistically represents all records of the data. Hence, the subset of records may be a number of non-consecutive records. For example, the subset of records may comprise at least two records between which the data comprises a plurality of records not included in the subset. This allows obtaining a statistically representative subset of records. The selected records of the subset of records should generally be well distributed over the data list 1. This could be obtained by selecting the records randomly on the basis of a certain statistical distribution. For example, a uniform distribution may be used. However, the disclosure is not so imitated, and other mechanisms may be used to select the records—e.g., using a fixed function, such as by taking every tenth record.

FIG. 2 illustrates an example use scenario for selection of a subset of records in structured and/or semi-structured data. Shown in FIG. 2 is the data list 1 of FIG. 1.

In this regard, FIG. 2 illustrates an example selection of a subset in structured and/or semi-structured data—e.g., a random selection of rows 21, 24, . . . as subset 40 of records. Due to this random selection of the subset 40, it comprises rows 21, 24, . . . of the first portion of rows 21, 22, 23, . . . , and rows 22', . . . of the second portion of rows 21', 22', . . . .

Once, the subset is selected, in a second step of the example enhanced DLP scheme, the fields of the selected subset 40 of categories are scanned for sensitive information. In this regard, sensitive information may comprise, for example, personal information like names, addresses, payment details like credit card numbers and other personal information or secret information.

The sensitive information may be general—that is, a type of sensitive information like names in general, or may be specific—e.g., a specific sensitive information like a specific credit card number of a client. The scan for sensitive information may be performed based on particular rules (e.g., to detect in general a credit card number or International Bank Account Number (IBAN) number) or based on keywords. In this regard, keywords and/or rules may also comprise search phrases or terms, search lists, and/or search patterns. For example, a name search may also comprise a search phrase or keyword(s), such as "Oil & Gas Ltd." For a type of information generally a rule or a set of keywords or dictionary (e.g. the most common names) is searched.

In an example implementation, the step of scanning for sensitive information comprises the search of at least two types of sensitive information. This is described with respect to FIG. 3.

FIG. 3 illustrates an example scanning result for sensitive information in structured and/or semi-structured data. Shown in FIG. 3 is the data list 1 of FIG. 1.

In this regard, FIG. 3 illustrates an example scanning result—e.g., a scanning result where in the subset 40 of categories names in general as a first type of sensitive information, credit card numbers in general as a second type of sensitive information, locations in general as a third type of sensitive information are searched. Names could be searched by searching for all keywords in a dictionary containing as keywords the most common names. Credit card numbers may be searched by a rule—e.g., identifying 16 digits. Locations may be searched by searching for all keywords in a dictionary containing as keywords the most common locations.

Thus, in the first column 31, for example, there were found names; in the second column 32, there were found credit card numbers; in the fourth column 34, there was found one field in which the keyword "Paris" was found which could be a name or a location; and in the second portion of rows in the sixth column 36 were found locations and in the first portion of the seventh column 37 were found as well locations.

Since some keywords and/or rules could indicate different type of sensitive information, those keywords and/or rules could be associated with more than one type of sensitive information. For example, the keyword "Paris" found in the fourth column 34 could indicate a location or a name. Obviously, those are only examples for types of sensitive information which shall not limit the invention.

However, other criteria scan may be utilized. For example, instead of searching type of sensitive information, it is also possible to scan the subset of records in a different manner—e.g., for concrete sensitive information like the names and information of a client data base.

Based on the scanning, in a third step of the example enhanced DLP scheme, for each category, a likelihood to contain the sensitive information is computed on the basis of the scanning result. In this regard, the likelihood to contain the sensitive information may be calculated on the basis of the fields of the subset 40 of records containing the sensitive information—e.g., the number of fields containing the sensitive information divided by the number or records/rows contained in the subset 40 of records.

In another implementation, for each field a likelihood to contain sensitive information or a certain type of information may be determined. The likelihood to contain a sensitive information could then be calculated on the basis of the likelihood of each field of the subset 40 of records to contain the sensitive information. For example, the likelihood for each field to contain sensitive information can be calculated by associating to each rule and/or each keyword for searching a certain type of sensitive information a likelihood to contain this searched type of sensitive information. If a keyword and/or a rule is/are associated with different types of sensitive information, different likelihoods could be related to each association. In the example use scenario described above, "Paris" may indicate with 20% probability a name and with 70% a location.

On the basis of those likelihoods that a field of the subset 40 of records contains a certain type of sensitive information, the likelihood that this type of sensitive information is contained in a category can be improved. For example, the likelihood to contain a certain type of sensitive information in a category may be further improved on the basis of meta-data, such as the heading 20 of each category. In this regard, the heading "name" in column 31 gives a strong indication that the column contains names. Such information is provided, e.g., by some database optimizers without additional data processing.

In an example implementation, the likelihoods of different type of sensitive information contained in a category or a field are combined to generate a likelihood to contain any sensitive information in the category or the field. In another example implementation, the likelihoods for different type of sensitive information are kept separate. In this case, the following steps would have to be performed for each type of sensitive information. Further, in some instances, the approach in both these implementations may be combined such that some type of sensitive information is kept separate (e.g., credit card numbers), while other types of sensitive information are combined to a likelihood of combined type of sensitive information contained in a category.

Based on the computed likelihoods of the categories to contain the sensitive information, in a fourth step of the example enhanced DLP scheme, a subset of categories is selected. This may be done based on, for example, a predetermined threshold. In this regard, all categories which have a likelihood to contain the sensitive information larger than such threshold(s) are included in the selected subset of categories. The threshold(s) may be configurable (e.g., by a user), such as to define a degree of reliability for the DLP scheme. This is described in more detail with respect to FIG. 4.

FIG. 4 illustrates an example use scenario for selection of a subset of classes in structured and/or semi-structured data. Shown in FIG. 3 is the data list 1 of FIG. 1.

In this regard, FIG. 4 illustrates an example selection of classes or categories in structured and/or semi-structured data—e.g., selection of a subset 50 of columns 31, 32, 34, 36 and 37 which potentially contains the sensitive information. In this regard, due to the statistically representative subset 40 of rows, it was also detected that the column 36 contains potentially locations, even though in the first portion of rows it contains only a binary information tag. Therefore, the enhanced DLP scheme may enable reliably detecting categories with potential sensitive information. In the case that different likelihoods per category for different types of sensitive information are computed, different subsets 50 of categories could be selected for each type of sensitive information.

For example, a first subset containing the column 32 for credit card information and a second subset containing the columns 31, 34, 36 and 37 for names and locations may be determined.

In a fifth step of the example enhanced DLP scheme, the sensitive information is searched in the selected subset 50 of categories. The same techniques as described for the scanning step could be used to search through the fields. For certain sensitive information which may be detected only in one column it could be advantageous to have different subsets for different type of sensitive information, like for the credit card information in column 32. For certain sensitive information like names and location, a combined subset is more advantageous, because keywords and/or rules associated with different types of sensitive information must be searched only once in this subset to detect two different types of sensitive information.

In an example implementation, the example enhanced DLP scheme may comprise an additional optional data loss prevention step, such as if potential sensitive information is found in the data. In this regard, possible data loss prevention steps may be comprise performing such action as documenting, notifying a user of, and/or blocking or quarantining the sensitive information found.

The term likelihood used in this application may be a value between 0 and 1. Nonetheless, the term likelihood may also cover comprise values indicating a likelihood-like value, such as, e.g., a score or a weight.

Other implementations of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain implementations, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular implementation disclosed, but that the present disclosure will include all implementations falling within the scope of the appended claims.

What is claimed is:

1. A method comprising:
applying data loss prevention to data that comprises a plurality of records and a plurality of categories, with each record comprising a plurality of fields and each of the plurality of fields corresponding to a different one of the plurality of categories, the applying of data loss prevention comprising:
selecting a subset of records from the plurality of records of the data, wherein the selected subset of records comprises at least two records having between them at least one record not included in the selected subset of records;
scanning fields of the selected subset of records for sensitive information, wherein the fields of the selected subset of records comprise the plurality of fields of each record of the selected subset of records; computing based on result of the scanning, for each category a likelihood to contain the sensitive information;
selecting a subset of categories based on the computed likelihoods of the categories to contain the sensitive information;
and searching the sensitive information in the selected subset of categories;
and determining a number of records of the selected subset of records based on a parameter of an infrastructure utilized in storing the data and/or applying the data loss prevention.

2. The method of claim 1, comprising determining a number of records of the selected subset of records based on a number of records and/or on a number of unique records in the data.

3. The method of claim 1, wherein the parameter comprises a speed of a processor applying the data loss prevention or a bandwidth of a communication link between the processor and a storage element where the data is stored.

4. The method of claim 1, wherein the likelihood to contain the sensitive information comprises more than two possible values of likelihood.

5. The method of claim 1, wherein the scanning of the fields of the selected subset of records for sensitive information comprises detecting a plurality of keywords and/or at least one rule in the fields of the selected subset of records.

6. The method of claim 5, wherein: each of the plurality of keywords and/or rules is associated with a likelihood to contain the sensitive information; and the likelihood to contain the sensitive information in a category is computed based on the likelihood associated with the keywords and/or rules in the category.

7. The method of claim 1, wherein the sensitive information comprises at least two types of sensitive information.

8. The method of claim 7, comprising scanning each of the at least two types of sensitive information in the selected subset of records based on detecting a plurality of keywords and/or at one least one rule; wherein: at least some of the keywords and/or the at least one rule are associated with different likelihoods to the at least two types of sensitive information; and the likelihood of a category to contain one of the at least two types of sensitive information in a field is based on the likelihood of the keywords and/or the at least one rule associated with this type of sensitive information which are found in this category.

9. The method of claim 7, wherein each keyword and/or rule associated with more of the at least two types of sensitive information is searched only once for detecting potential occurrences of all types of sensitive information related to the searched keyword and/or rule.

10. A system comprising:
a storage circuit operable to store data, wherein the data comprises a plurality of records and a plurality of categories, with each record comprising a plurality of fields and each of the plurality of fields corresponding to a different one of the plurality of categories; and a processor configured to apply data loss prevention to the data, the processor being operable to:

select a subset of records from the plurality of records of the data, wherein the selected subset of records comprises at least two records having between them at least one record not included in the selected subset of records;

scan fields of the selected subset of records for sensitive information, wherein the fields of the selected subset of records comprise the plurality of fields of each record of the selected subset of records;

compute based on result of the scanning, for each category a likelihood to contain the sensitive information;

select a subset of categories based on the computed likelihoods of the categories to contain the sensitive information;

search the sensitive information in the selected subset of categories;

and determine a number of records of the selected subset of records based on a parameter of the system.

11. The system of claim 10, wherein the processor is operable to determine a number of records of the selected subset of records based on a number of records and/or on a number of unique records in the data.

12. The system of claim 10, wherein the parameter comprises a speed of the processor and/or a bandwidth of a communication link between the storage circuit and the processor.

13. The system of claim 10, wherein the likelihood to contain the sensitive information comprises more than two possible values of likelihood.

14. The system of claim 10, wherein the scanning of the fields of the selected subset of records for sensitive information comprises detecting a plurality of keywords and/or at least one rule in the fields of the selected subset of records.

15. The system of claim 14, wherein: each of the plurality of keywords and/or rules is associated with a likelihood to contain the sensitive information; and the likelihood to contain the sensitive information in a category is computed based on the likelihood associated with the keywords and/or rules in the category.

16. The system of claim 10, wherein the sensitive information comprises at least two types of sensitive information.

17. The system of claim 16, wherein the processor is operable to scan each of the at least two types of sensitive information in the selected subset of records based on detecting a plurality of keywords and/or at one least one rule; wherein: at least some of the keywords and/or the at least one rule are associated with different likelihoods to the at least two types of sensitive information; and the likelihood of a category to contain one of the at least two types of sensitive information in a field is based on the likelihood of the keywords and/or the at least one rule associated with this type of sensitive information which are found in this category.

18. The system of claim 16, wherein each keyword and/or rule associated with more of the at least two types of sensitive information is searched only once for detecting potential occurrences of all types of sensitive information related to the searched keyword and/or rule.

19. A method comprising:

applying data loss prevention to data that comprises a plurality of records and a plurality of categories, with each record comprising a plurality of fields and each of the plurality of fields corresponding to a different one of the plurality of categories, the applying of data loss prevention comprising:

selecting a subset of records from the plurality of records of the data, wherein the selected subset of records comprises at least two records having between them at least one record not included in the selected subset of records;

scanning fields of the selected subset of records for sensitive information, wherein the fields of the selected subset of records comprise the plurality of fields of each record of the selected subset of records;

computing based on result of the scanning, for each category a likelihood to contain the sensitive information;

selecting a subset of categories based on the computed likelihoods of the categories to contain the sensitive information;

and searching the sensitive information in the selected subset of categories;

and determining a number of records of the selected subset of records based on a number of records and/or on a number of unique records in the data.

20. The method of claim 19, wherein the likelihood to contain the sensitive information comprises more than two possible values of likelihood.

21. The method of claim 19, wherein the scanning of the fields of the selected subset of records for sensitive information comprises detecting a plurality of keywords and/or at least one rule in the fields of the selected subset of records.

22. The method of claim 21, wherein: each of the plurality of keywords and/or rules is associated with a likelihood to contain the sensitive information; and the likelihood to contain the sensitive information in a category is computed based on the likelihood associated with the keywords and/or rules in the category.

23. The method of claim 19, wherein the sensitive information comprises at least two types of sensitive information.

24. The method of claim 23, comprising scanning each of the at least two types of sensitive information in the selected subset of records based on detecting a plurality of keywords and/or at one least one rule; wherein: at least some of the keywords and/or the at least one rule are associated with different likelihoods to the at least two types of sensitive information; and the likelihood of a category to contain one of the at least two types of sensitive information in a field is based on the likelihood of the keywords and/or the at least one rule associated with this type of sensitive information which are found in this category.

25. The method of claim 23, wherein each keyword and/or rule associated with more of the at least two types of sensitive information is searched only once for detecting potential occurrences of all types of sensitive information related to the searched keyword and/or rule.

26. A system comprising:

a storage circuit operable to store data, wherein the data comprises a plurality of records and a plurality of categories, with each record comprising a plurality of fields and each of the plurality of fields corresponding to a different one of the plurality of categories; and a processor configured to apply data loss prevention to the data, the processor being operable to:

select a subset of records from the plurality of records of the data, wherein the selected subset of records comprises at least two records having between them at least one record not included in the selected subset of records;

scan fields of the selected subset of records for sensitive information, wherein the fields of the selected subset of records comprise the plurality of fields of each record of the selected subset of records;

compute based on result of the scanning, for each category a likelihood to contain the sensitive information;

select a subset of categories based on the computed likelihoods of the categories to contain the sensitive information;

search the sensitive information in the selected subset of categories;

and determine a number of records of the selected subset of records based on a number of records and/or on a number of unique records in the data.

27. The system of claim 26, wherein the likelihood to contain the sensitive information comprises more than two possible values of likelihood.

28. The system of claim 26, wherein the scanning of the fields of the selected subset of records for sensitive information comprises detecting a plurality of keywords and/or at least one rule in the fields of the selected subset of records.

29. The system of claim 28, wherein: each of the plurality of keywords and/or rules is associated with a likelihood to contain the sensitive information; and the likelihood to contain the sensitive information in a category is computed based on the likelihood associated with the keywords and/or rules in the category.

30. The system of claim 26, wherein the sensitive information comprises at least two types of sensitive information.

31. The system of claim 30, wherein the processor is operable to scan each of the at least two types of sensitive information in the selected subset of records based on detecting a plurality of keywords and/or at one least one rule; wherein: at least some of the keywords and/or the at least one rule are associated with different likelihoods to the at least two types of sensitive information; and the likelihood of a category to contain one of the at least two types of sensitive information in a field is based on the likelihood of the keywords and/or the at least one rule associated with this type of sensitive information which are found in this category.

32. The system of claim 30, wherein each keyword and/or rule associated with more of the at least two types of sensitive information is searched only once for detecting potential occurrences of all types of sensitive information related to the searched keyword and/or rule.

\* \* \* \* \*